(12) United States Patent
Terao et al.

(10) Patent No.: US 7,765,474 B2
(45) Date of Patent: Jul. 27, 2010

(54) ELECTRONIC-DOCUMENT MANAGEMENT SYSTEM AND METHOD

(75) Inventors: Taro Terao, Kanagawa (JP); Meng Shi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 986 days.

(21) Appl. No.: 11/505,460

(22) Filed: Aug. 17, 2006

(65) Prior Publication Data

US 2007/0198913 A1 Aug. 23, 2007

(30) Foreign Application Priority Data

Feb. 22, 2006 (JP) ............... 2006-045952

(51) Int. Cl.
*G06F 17/00* (2006.01)
(52) U.S. Cl. ..................... 715/255; 715/229
(58) Field of Classification Search ........... 715/255, 715/229
See application file for complete search history.

(56) References Cited

U.S. PATENT DOCUMENTS

| | | | | | |
|---|---|---|---|---|---|
| 5,666,490 | A * | 9/1997 | Gillings et al. | ............ | 709/238 |
| 5,845,304 | A * | 12/1998 | Iijima | ............ | 715/234 |
| 5,895,470 | A * | 4/1999 | Pirolli et al. | ............ | 707/102 |
| 5,983,212 | A * | 11/1999 | Kataoka et al. | ............ | 1/1 |
| 6,026,416 | A * | 2/2000 | Kanerva et al. | ............ | 715/208 |
| 6,209,004 | B1 * | 3/2001 | Taylor | ............ | 715/236 |
| 6,430,563 | B1 * | 8/2002 | Fritz et al. | ............ | 707/10 |
| 6,567,817 | B1 * | 5/2003 | VanLeer | ............ | 1/1 |
| 6,574,640 | B1 * | 6/2003 | Stahl | ............ | 707/204 |
| 6,708,189 | B1 * | 3/2004 | Fitzsimons et al. | ............ | 707/205 |
| 6,847,984 | B1 * | 1/2005 | Midgley et al. | ............ | 1/1 |
| 6,850,252 | B1 * | 2/2005 | Hoffberg | ............ | 715/716 |
| 7,047,241 | B1 * | 5/2006 | Erickson | ............ | 1/1 |
| 7,216,289 | B2 * | 5/2007 | Kagle et al. | ............ | 715/256 |
| 7,480,665 | B2 * | 1/2009 | Merchant et al. | ............ | 1/1 |
| 7,522,046 | B2 * | 4/2009 | Decker et al. | ............ | 340/568.1 |
| 7,529,784 | B2 * | 5/2009 | Kavuri et al. | ............ | 1/1 |
| 7,689,900 | B1 * | 3/2010 | Fifield et al. | ............ | 715/230 |
| 2001/0056463 | A1 * | 12/2001 | Grady et al. | ............ | 709/203 |
| 2002/0087602 | A1 * | 7/2002 | Masuda et al. | ............ | 707/515 |
| 2002/0133516 | A1 * | 9/2002 | Davis et al. | ............ | 707/513 |
| 2003/0187855 | A1 * | 10/2003 | Fachat et al. | ............ | 707/100 |

(Continued)

FOREIGN PATENT DOCUMENTS

JP A 6-77994 3/1994

*Primary Examiner*—Laurie Ries
(74) *Attorney, Agent, or Firm*—Oliff & Berridge, PLC

(57) ABSTRACT

An electronic-document management system includes an acquisition unit, an edit unit, first and second storage units, a generation unit and an output unit. The acquisition unit acquires a target electronic document. The edit unit edits the acquired target electronic document. The first storage unit stores the target electronic document edited by the edit unit and a feature value of the edited target electronic document in association with each other. The generation unit generates meta-information of the edited target electronic document, which comprises a feature value of the edited target electronic document. The second storage unit stores the meta-information of the edited target electronic document and a feature value of the meta-information of the edited target electronic document in association with each other. The output unit outputs the feature value of the meta-information of the edited target electronic document as reference information of the edited target electronic document.

18 Claims, 4 Drawing Sheets

| USER IDENTIFIER | REFERENCE INFORMATION OF DOCUMENT(S) |
|---|---|
| X | HASH VALUE α, HASH VALUE β", ... |
| Y | HASH VALUE β', HASH VALUE α', ... |

U.S. PATENT DOCUMENTS

| | | | |
|---|---|---|---|
| 2003/0227487 A1* | 12/2003 | Hugh | 345/777 |
| 2004/0117374 A1* | 6/2004 | Hung et al. | 707/10 |
| 2004/0148278 A1* | 7/2004 | Milo et al. | 707/3 |
| 2004/0225658 A1* | 11/2004 | Horber | 707/9 |
| 2005/0005237 A1* | 1/2005 | Rail et al. | 715/530 |
| 2005/0132070 A1* | 6/2005 | Redlich et al. | 709/228 |
| 2005/0204191 A1* | 9/2005 | McNally et al. | 714/15 |
| 2005/0288939 A1* | 12/2005 | Peled et al. | 705/1 |
| 2007/0011616 A1* | 1/2007 | Ording et al. | 715/738 |
| 2007/0162467 A1* | 7/2007 | Wolber et al. | 707/100 |
| 2007/0250714 A1* | 10/2007 | Kawada | 713/175 |
| 2008/0320377 A1* | 12/2008 | Seetharamakrishnan et al. | 715/200 |
| 2009/0199011 A1* | 8/2009 | Kawara | 713/176 |

\* cited by examiner

FIG. 2

| HASH VALUE | ELECTRONIC DOCUMENT OR META-INFORMATION |
|---|---|
| HASH VALUE A | ELECTRONIC DOCUMENT A |
| HASH VALUE α | META-INFORMATION OF ELECTRONIC DOCUMENT A |
| HASH VALUE A' | ELECTRONIC DOCUMENT A' |
| HASH VALUE α' | META-INFORMATION OF ELECTRONIC DOCUMENT A' |

FIG. 3

| REFERENCE INFORMATION OF NEW DOCUMENT | REFERENCE INFORMATION OF EDITED DOCUMENT(S) |
|---|---|
| HASH VALUE α | HASH VALUE α', HASH VALUE α", ... |
| HASH VALUE β | HASH VALUE β', HASH VALUE β", ... |

FIG. 4

| USER IDENTIFIER | REFERENCE INFORMATION OF DOCUMENT(S) |
|---|---|
| X | HASH VALUE α, HASH VALUE β", ... |
| Y | HASH VALUE β', HASH VALUE α', ... | under # ELECTRONIC-DOCUMENT MANAGEMENT SYSTEM AND METHOD

BACKGROUND

1. Technical Field

The invention relates to an electronic-document management system and a method and in particular to an electronic-document management system and a method, which are capable of realizing traceability of an electronic document.

2. Related Art

As importance of an electronic document in life in society becomes higher, importance of traceability of the electronic document is recognized. The traceability of the electronic document means that a history of document distribution is recorded and document distribution is later specified from the record.

SUMMARY

According to an aspect of the invention, an electronic-document management system includes an acquisition unit, an edit unit, first and second storage units, a generation unit and an output unit. The acquisition unit acquires a target electronic document. The edit unit edits the acquired target electronic document. The first storage unit stores the target electronic document edited by the edit unit and a feature value of the edited target electronic document in association with each other. The generation unit generates meta-information of the edited target electronic document, which comprises a feature value of the edited target electronic document. The second storage unit stores the meta-information of the edited target electronic document and a feature value of the meta-information of the edited target electronic document in association with each other. The output unit outputs the feature value of the meta-information of the edited target electronic document as reference information of the edited target electronic document.

BRIEF DESCRIPTION OF THE DRAWINGS

Exemplary embodiments of the invention will be described in detail based on the following figures, wherein:

FIG. 2 is a drawing to show the configuration of a document management database;

FIG. 3 is a drawing to show the configuration of a document-unit edit history database;

FIG. 4 is a drawing to show the configuration of a user-unit edit history database;

DETAILED DESCRIPTION

Referring now to the accompanying drawings, exemplary embodiments of the invention will be described.

Figure 1:
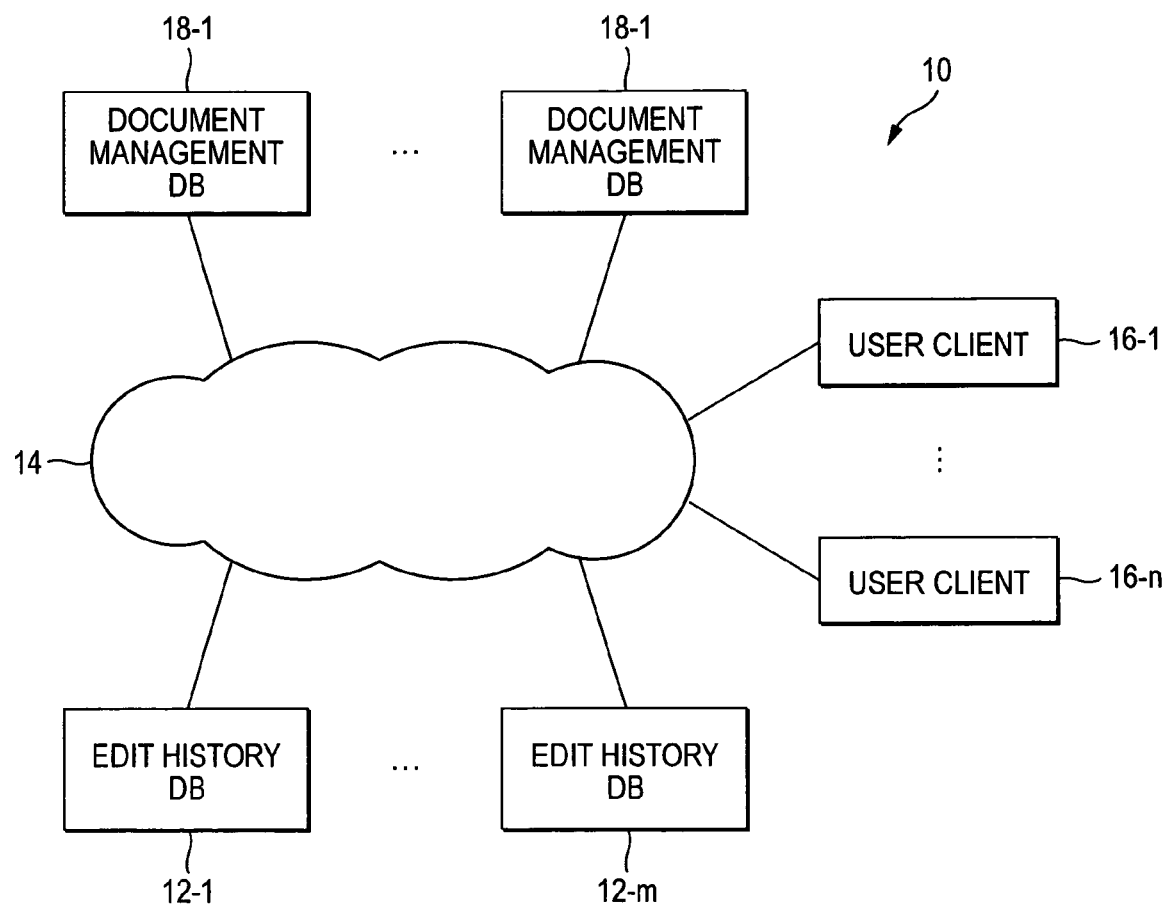
FIG. 1 is a drawing to show an electronic-document management system according to an exemplary embodiment of the invention.

FIG. 1 is a drawing to show the general configuration of an electronic-document management system according to an exemplary embodiment of the invention. As shown in FIG. 1, an electronic-document management system 10 includes a plurality of document management databases 18, a plurality of edit history databases 12, and a plurality of user clients 16. These components 12, 16, 18 of the electronic-document management system 10 are connected to a communication network 14. The document management database 18 is a database system implemented by a known server computer and has a configuration shown in FIG. 2. That is, the document management databases 18 store entities of various electronic documents and meta-information of the electronic documents (described later) in association with hash values (which are an example of feature values) of the electronic documents. Electronic documents include newly created electronic documents and electronic documents provided by editing any electronic document. For one electronic document, entity of the one electronic document and a hash value of the one electronic document are registered in the document management database 18 in association with each other. Also, meta-information of the one electronic document and a hash value of the meta-information of the one electronic document are registered in the document management database 18 in association with each other. A user is notified of the hash value of the meta-information of the one electronic document as reference information of the one electronic document relevant to the meta-information. Each meta-information contains a hash value of an electronic document relevant to the meta-information. When transmitting reference information of an electronic document to the document management database 18, the user client 16 receives the meta-information of the electronic document as a reply. When again transmitting the hash value contained in the returned meta-information of the electronic document to the document management database 18, the user client 16 receives the electronic document associated with the transmitted hash value as a reply.

Like the document management database 18, the edit history database 12 is a database system implemented by a known server computer. The edit history database 12 includes a document-unit edit history database having configuration shown in FIG. 3 and a user-unit edit history database having configuration shown in FIG. 4. As shown in FIG. 3, the document-unit edit history database stores reference information (a hash value of meta-information) of a new document and reference information (a hash value of meta-information) of a document provided by editing the new document once or plural times in association with each other. As shown in FIG. 4, the user-unit edit history database stores reference information of documents, which are newly created or edited by each user, in association with a user identifier of the user.

Figure 5:
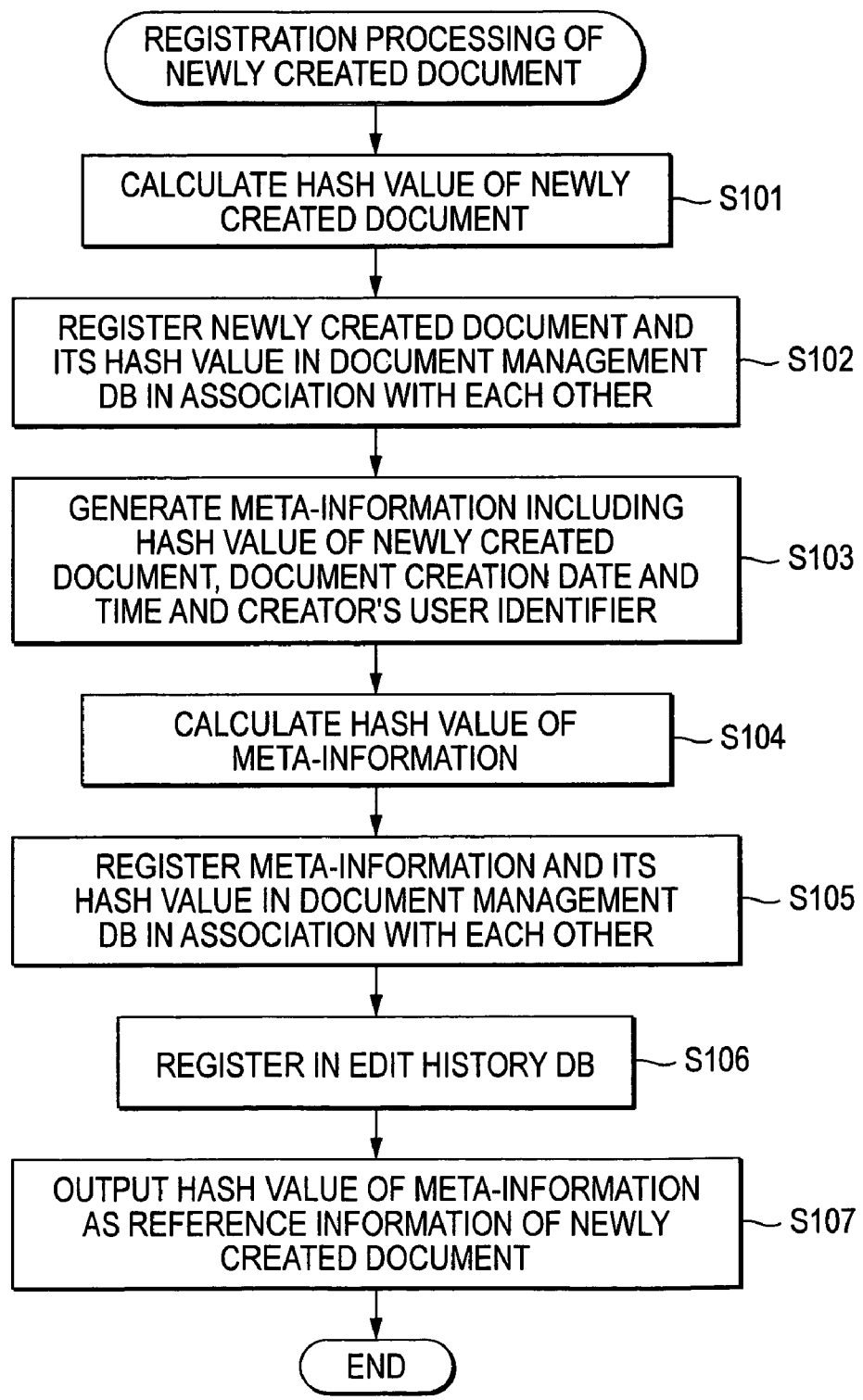
FIG. 5 is a flowchart to show registration processing of a new document in a user client.

FIG. 5 is a flowchart to show processing of registering a new electronic document into the electronic-document management system 10. As shown in FIG. 5, if a new electronic document is prepared using a word processing application software or a spreadsheet application software, for example, in the user client 16, the user client 16 calculates a hash value of the new electronic document (S101). The user client 16 associates the newly created electronic document (entity) and the hash value of the newly created electronic document with each other and transmits to any of the document management databases 18, to register the new electronic document and the hash value of the new electronic document in the document management database 18 in association with each other (S102). Further, the user client 16 generates meta-information of the new electronic document including (i) the hash value of the new electronic document, which is generated at S101, (ii) creation date and time of the newly created electronic document, and a user identifier of a user who is a creator, for example, in an XML document format (S103). The user client 16 also calculates a hash value of the thus-generated meta-information of the new electronic document (S104).

The user client 16 also transmits the thus-generated meta-information of the new electronic document and the hash value of the meta-information of the new electronic document to any of the document management databases 18, to register the meta-information of the new electronic document and the hash value of the meta-information of the new electronic document in the document management database 18 in association with each other (S105). Further, the user client 16 transmits the user identifier of the user who newly creates the document and the hash value of the meta-information of the new electronic document calculated at S104 (reference information of the newly created document) to the edit history database 12, to register those information (the transmitted user identifier and the transmitted hash value) in the document unit history database and the user-unit edit history database (S106). That is, a new record is created in the document-unit edit history database and the hash value of the meta-information of the new electronic document calculated at S104 is registered into a column "reference information of new document." Also, the hash value of the meta-information of the new electronic document calculated at S104 is registered in the user-unit edit history database in association with the user identifier.

Then, the user client 16 displays the hash value of the meta-information of the new electronic document calculated at S104, for example, on a display as reference information of the newly created document (S107). Alternatively, the user client 16 may create a file having the hash value of the meta-information of the new electronic document as a value. The reference information thus output is sent to another user by means of, for example, an electronic mail. Also, as described above, by transmitting reference information to the document management database 18, the user client 16 can acquire an electronic document corresponding to the transmitted reference information.

Each document management database 18 registers electronic documents and meta-information of the electronic documents in association with hash values of the electronic documents and hash values of the meta-information of the electronic documents, respectively. For example, a cryptographic hash function having collision tolerance, such as SHA-256, may be used. Thereby, collision between hash values can be virtually ignored and each document management database 18 can be used as a distributed database.

Figure 6:
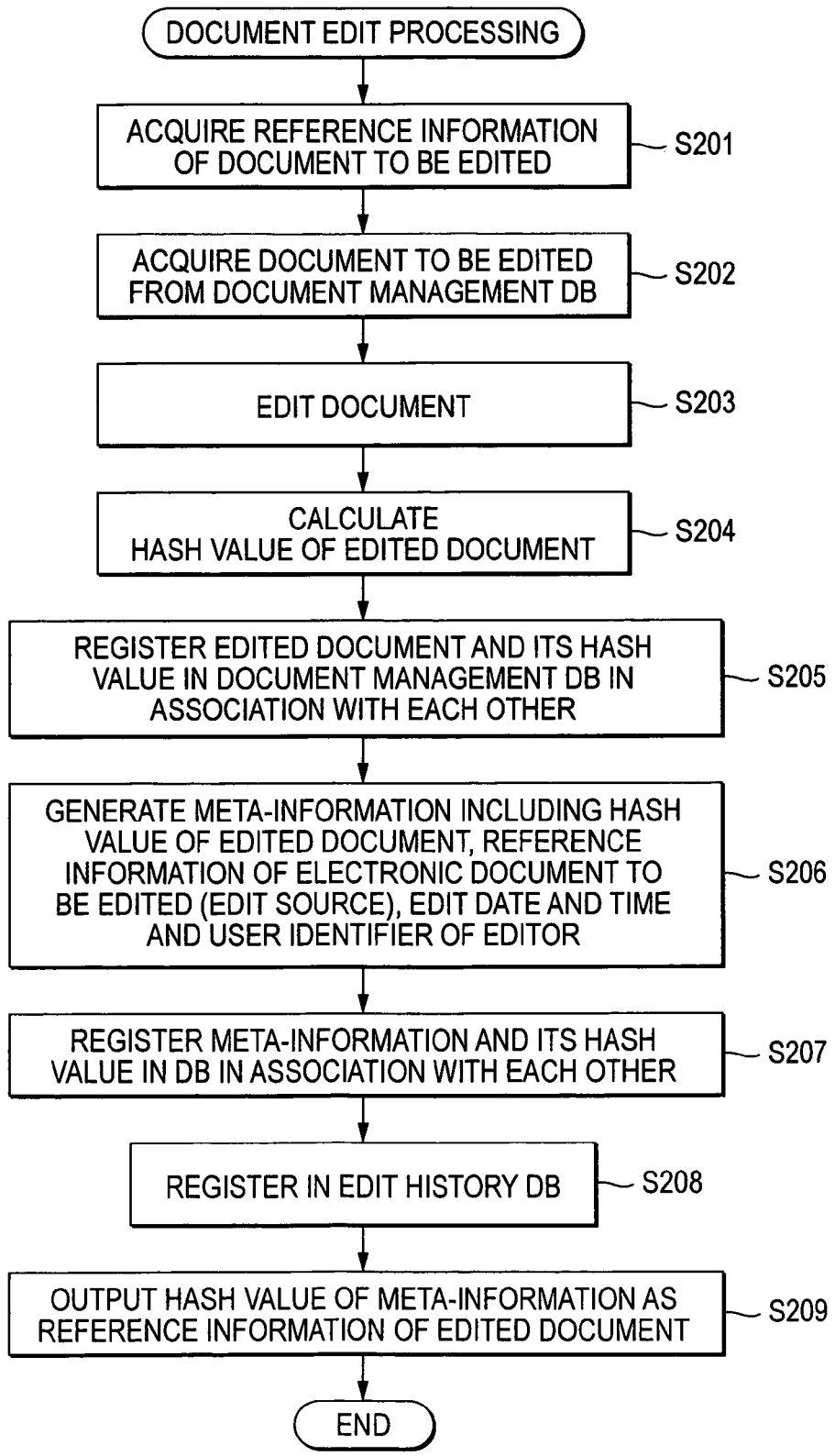
FIG. 6 is a flowchart to show document edit processing in the user client.

FIG. 6 is a flowchart to show processing of editing an electronic document in the electronic-document management system 10. In the case where a user who acquires reference information of a newly created electronic document or an electronic document edited by another user as described above is to edit the acquired electronic document using the user client 16, the user client 16 acquires the reference information of the electronic document to be edited (which may be referred to as a "target electronic data"), acquired by the user (S201). The user client 16 reads the target electronic document from any of the document management databases 18 based on the reference information of the target electronic document (S202). Then, the electronic document acquired at S202 is edited using a word processing application software and/or a spreadsheet application software, for example (S203).

The user client 16 calculates a hash value of the edited target electronic document (S204) and transmits the edited target electronic document and the hash value of the edited target electronic document to any of the document management databases 18. Thus, the edited target electronic document and the hash value of the edited target electronic document are registered in the document management database 18 in association with each other (S205).

Subsequently, the user client 16 generates meta-information of the edited target electronic document, which includes (i) the hash value of the edited target electronic document, (ii) the reference information of the target electronic document (edit source) acquired at S201, (iii) edit date and time, and (iv) a user identifier of the user who is an editor, for example, in an XML format (S206). The user client 16 generates the hash value of the generated meta-information of the edited target electronic document and transmits the meta-information of the edited target electronic document and the hash value of the meta-information of the edited target electronic document to any of the document management databases 18, to register the transmitted meta-information and the transmitted hash value in the document management database 18 in association with each other (S207).

Further, the user client 16 transmits to the edit history database 12 the user identifier of the user who edits the target electronic document, the hash value of the meta-information of the edited target electronic document calculated at S207 (reference information of the edited target electronic document) and the reference information of the target electronic document (edit source) acquired at S201, to register transmitted information (the transmitted user identifier, the transmitter has value, the transmitted reference information) in the document-unit history database and the user-unit edit history database (S208). That is, the document-unit edit history database is searched for a record where the reference information of the target electronic document acquired at 201 is recorded as reference information of a new document or reference information of an edited document and then, the hash value of the meta-information of the edited target electronic document calculated at S207 is registered in column "reference information of edited document" of the record. The hash value of the meta-information of the edited target electronic document calculated at S207 is registered in the user-unit edit history database in association with the user identifier.

Then, the user client 16 displays the hash value of the meta-information of the edited target electronic document calculated at S207, for example, on the display as the reference information of the target electronic document edited by the user (S209). Alternatively, the user client 16 may update the file having the hash value as a value. The thus-output reference information of the edited target electronic document is sent to another user by means of, for example the electronic mail. When this reference information of the edited target electronic document is transmitted to the document management database 18, the corresponding edited target electronic document can be obtained, as described above.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic-document management system comprising:

an acquisition unit that acquires a target electronic document;

an edit unit that edits the acquired target electronic document;

a first storage unit that stores the target electronic document edited by the edit unit and a first hash value of the edited target electronic document in association with each other;

a generation unit that generates the first hash value corresponding to the edited target electronic document, generates meta-information of the edited target electronic document, which comprises reference information of the target electronic document and the first hash value, and generates a second hash value corresponding to the generated meta-information of the edited target electronic document;

a second storage unit that stores the meta-information of the edited target electronic document and the second hash value in association with each other; and an output unit that outputs the second hash value as reference information of the edited target electronic document.

2. The system according to claim 1, further comprising:
a third storage unit that stores the reference information of the target electronic document and the reference information of the edited target electronic document in association with each other.

3. The system according to claim 2, further comprising:
a fourth storage unit that stores reference information of an electronic document, which is newly created or edited by a user identified by a user identifier, in association with the user identifier.

4. The system according to claim 3, wherein meta-information of each electronic document comprises attribute information of the corresponding electronic document.

5. The system according to claim 2, wherein meta-information of each electronic document comprises attribute information of the corresponding electronic document.

6. The system according to claim 1, further comprising:
a fourth storage unit that stores reference information of an electronic document, which is newly created or edited by a user identified by a user identifier, in association with the user identifier.

7. The system according to claim 6, wherein meta-information of each electronic document comprises attribute information of the corresponding electronic document.

8. The system according to claim 1, wherein meta-information of each electronic document comprises attribute information of the corresponding electronic document.

9. An electronic-document management system comprising:
an acquisition unit that acquires a target electronic document;

an edit unit that edits the acquired target electronic document;

a first storage unit that stores the target electronic document edited by the edit unit and a first hash value of the edited target electronic document in association with each other;

a generation unit that generates the first hash value corresponding to the edited target electronic document, generates meta-information of the edited target electronic document, which comprises reference information of the target electronic document and the first hash value, and generates a second hash value corresponding to the meta-information of the edited target electronic document;

a second storage unit that stores the meta-information of the edited target electronic document and the second hash value in association with each other;

an output unit that outputs the second hash value as reference information of the edited target electronic document; and a creation unit that newly creates an electronic document, wherein:
the first storage unit stores the electronic document newly created by the creation unit and a third hash value of the newly created electronic document in association with each other, the generation unit generates the third hash value corresponding to the newly created electronic document and generates meta-information of the newly created electronic document, which comprises the third hash value, and the output unit outputs a fourth hash value corresponding to the meta-information of the newly created electronic document, which comprises the third hash value of the newly created electronic document, as reference information of the newly created electronic document.

10. The system according to claim 9, further comprising:
a third storage unit that stores the reference information of the target electronic document and the reference information of the edited target electronic document in association with each other.

11. The system according to claim 10, further comprising:
a fourth storage unit that stores reference information of an electronic document, which is newly created or edited by a user identified by a user identifier, in association with the user identifier.

12. The system according to claim 11, wherein meta-information of each electronic document comprises attribute information of the corresponding electronic document.

13. The system according to claim 10, wherein meta-information of each electronic document comprises attribute information of the corresponding electronic document.

14. The system according to claim 9, further comprising:
a fourth storage unit that stores reference information of an electronic document, which is newly created or edited by a user identified by a user identifier, in association with the user identifier.

15. The system according to claim 14, wherein meta-information of each electronic document comprises attribute information of the corresponding electronic document.

16. The system according to claim 9, wherein meta-information of each electronic document comprises attribute information of the corresponding electronic document.

17. An electronic-document management method comprising:
acquiring a target electronic document;

editing the acquired target electronic document;

storing the edited target electronic document and a first hash value of the edited target electronic document in association with each other;

generating the first hash value corresponding to the edited target electronic document, generating meta-information of the edited target electronic document, which comprises the first hash value, and generating a second hash value corresponding to the meta-information of the edited target electronic document, storing the meta-information of the edited target electronic document and the second hash value in association with each other; and outputting the second hash value as reference information of the edited target electronic document.

18. A computer readable medium storing a program causing a computer to execute a process for managing electronic documents, the process comprising:

acquiring a target electronic document;

editing the acquired target electronic document;

storing the edited target electronic document and a first hash value of the edited target electronic document in association with each other;

generating the first hash value corresponding to the edited target electronic document, generating meta-information of the edited target electronic document, which comprises the first hash value, and generating a second hash value corresponding to the meta-information of the edited target electronic document;

storing the meta-information of the edited target electronic document and the second hash value of the meta-information of the edited target electronic document in association with each other; and outputting the second hash value of the meta-information of the edited target electronic document as reference information of the edited target electronic document.

* * * * *